(12) United States Patent
Isenhour et al.

(10) Patent No.: US 9,176,288 B2
(45) Date of Patent: Nov. 3, 2015

(54) OPTICAL PLUG CONNECTOR HAVING AN OPTICAL BODY WITH A LENS ON A REFLECTIVE SURFACE

(71) Applicant: CORNING OPTICAL COMMUNICATIONS LLC, Hickory, NC (US)

(72) Inventors: Micah Colen Isenhour, Lincolnton, NC (US); Dennis Michael Knecht, Hickory, NC (US); James Phillip Luther, Hickory, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/482,396

(22) Filed: Sep. 10, 2014

(65) Prior Publication Data

US 2015/0078714 A1 Mar. 19, 2015

Related U.S. Application Data

(60) Provisional application No. 61/877,538, filed on Sep. 13, 2013.

(51) Int. Cl.
*G02B 6/42* (2006.01)
*G02B 6/12* (2006.01)

(52) U.S. Cl.
CPC .... *G02B 6/4204* (2013.01); *G02B 2006/12102* (2013.01); *G02B 2006/12147* (2013.01); *G02B 2006/12166* (2013.01)

(58) Field of Classification Search
CPC ...... G02B 6/3522; G02B 6/36; G02B 6/2817; G02B 6/3817; G02B 6/262; G02B 6/3504; G02B 6/3632; G02B 6/3644; G02B 6/4214; G02B 6/0013; G02B 6/3829; G02B 6/4249; G02B 6/4293; G02B 6/4292
USPC ........................................ 385/115, 18, 47, 88
See application file for complete search history.

(56) References Cited

U.S. PATENT DOCUMENTS

| 4,840,581 | A | * | 6/1989 | Leufert | H01R 13/595 439/472 |
|---|---|---|---|---|---|
| 5,109,452 | A | * | 4/1992 | Selvin et al. | 385/69 |
| 5,252,092 | A | * | 10/1993 | Reider | H01R 13/436 439/595 |
| 6,636,663 | B2 | * | 10/2003 | Lindsey | G02B 6/262 385/33 |
| 6,802,654 | B1 | * | 10/2004 | Roberts et al. | 385/88 |
| 8,315,492 | B2 | | 11/2012 | Chen et al. | 385/33 |
| 2006/0172562 | A1 | * | 8/2006 | Weidner | H01R 24/50 439/63 |
| 2014/0099061 | A1 | * | 4/2014 | Isenhour | G02B 6/3887 385/79 |
| 2014/0355934 | A1 | * | 12/2014 | Shao et al. | 385/33 |

FOREIGN PATENT DOCUMENTS

JP 02297509 A * 12/1990 ............... G02B 6/38

* cited by examiner

*Primary Examiner* — Eric Wong (57) ABSTRACT

Disclosed are optical plug connectors and methods for making the same. The disclosure is directed to optical connectors. In one embodiment, the optical connector includes an optical body having at least one optical channel with an optical interface at a first side. The at least one optical channel having a total internal reflection (TIR) surface with a lens at the second side for turning the optical signal, and at least one fiber lead-in aligned to the TIR surface. The TIR surface may be angled in one or more directions from a longitudinal axis to allow a small form-factor for the optical body. In one embodiment, the optical body has a plurality of optical channels each having a discrete TIR surface. The optical connections disclosed herein may optionally also include an electrical connection if desired.

22 Claims, 7 Drawing Sheets

OPTICAL PLUG CONNECTOR HAVING AN OPTICAL BODY WITH A LENS ON A REFLECTIVE SURFACE

PRIORITY APPLICATION

This application claims the benefit of priority under 35 U.S.C. §119 of U.S. Provisional Application Ser. No. 61/877,538, filed on Sep. 13, 2013, the content of which is relied upon and incorporated herein by reference in its entirety.

FIELD

The disclosure is directed to an optical connector having an optical body with a lens on a reflective surface such as a total internal reflection (TIR) surface. In one embodiment, each optical channel of the optical body has a discrete TIR surface for that optical channel.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. These types of devices will require a large number of mating/unmating cycles during their lifetime. Further, as the devices become compact and relatively thin the associated optical connectors should also become compact with a relatively small footprint while still being robust enough for consumer applications.

Thus, there is an unresolved need for optical connectors that may be used with consumer or other devices that can accommodate harsh treatment of the consumer environment, the large number of mating/unmating cycles expected during the lifetime of the device, and having a suitably compact footprint.

SUMMARY

The disclosure is directed to optical connectors. In one embodiment, the optical connector includes an optical body having at least one optical channel with an optical interface at a first side. The at least one optical channel having a total internal reflection (TIR) surface with a lens at the second side for turning the optical signal, and at least one fiber lead-in aligned to the TIR surface. In one embodiment, the TIR surface is angled relative to a longitudinal axis defined between a first alignment feature and a second alignment feature that are disposed on the first side of the optical body. For instance, the TIR surface may be angled by a first non-zero angle in a first plane relative to a longitudinal axis defined between the first alignment feature and the second alignment feature. Likewise, the TIR surface may be angled by a second non-zero angle in a second plane that is generally perpendicular to the first plane relative to a longitudinal axis defined between the first alignment feature and the second alignment feature. In a further embodiment, the optical body has a plurality of optical channels each having a discrete TIR surface.

The disclosure is also directed to an optical connector including an optical body having at least one optical channel with an optical interface at a first side. The at least one optical channel having a total internal reflection (TIR) surface with a lens at the second side for turning the optical signal, and at least one fiber lead-in aligned to the TIR surface. The optical connection also includes one or more openings at the second side for receiving one or more magnetic materials and the one or more openings being aligned with one or more alignment features on the first side of the optical body. In one embodiment, the TIR surface is angled relative to a longitudinal axis defined between a first alignment feature and a second alignment feature that are disposed on the first side of the optical body. For instance, the TIR surface may be angled by a first non-zero angle in a first plane relative to a longitudinal axis defined between the first alignment feature and the second alignment feature. Likewise, the TIR surface may be angled by a second non-zero angle in a second plane that is generally perpendicular to the first plane relative to a longitudinal axis defined between the first alignment feature and the second alignment feature. In a further embodiment, the optical body has a plurality of optical channels each having a discrete TIR surface. The optical connections disclosed herein may optionally also include an electrical connection if desired.

The disclosure is also directed to method for making an optical connector. One explanatory method of making an optical connector includes the steps of providing an optical body having a plurality of optical channels with an optical interface portion at a first side, the plurality of optical channels each having a respective TIR surface with a lens at a second side for turning the optical signal, and at least one fiber lead-in aligned to the TIR surface, and attaching at least one optical fiber to the at least one fiber lead-in. The method may also optionally include the step of attaching one or more magnetic materials to one or more openings at the second side of the optical body, where the one or more openings are aligned with one or more alignment features on the first side of the optical body. Additionally, the method may also optionally further include the step of attaching one or more electrical contacts to the optical body. The method may also optionally include providing an optical body where the TIR surface may be angled by a first non-zero angle in a first plane relative to a longitudinal axis defined between the first alignment feature and the second alignment feature. Likewise, the TIR surface may be angled by a second non-zero angle in a second plane that is generally perpendicular to the first plane relative to a longitudinal axis defined between the first alignment feature and the second alignment feature.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The

DETAILED DESCRIPTION

Reference will now be made in detail to the embodiments of the disclosure, examples of which are illustrated in the accompanying drawings. Whenever possible, like reference numbers will be used to refer to like components or parts.

The optical connectors disclosed herein enable high-speed data applications for transmitting optical signals to and from electronic devices. Further, the optical connectors may have a relatively small and compact footprint so that they are useful for on cable assemblies, but the concepts disclosed may be adapted to optical ports on electronic devices such as consumer devices, as well as other suitable applications. The optical connectors include an optical body having at least one optical channel with an optical interface portion at a first side so it can receive and/or transmit optical signals from a complimentary optical connector. The optical channel may include a total internal reflection (TIR) surface with a lens at a second side of the optical body for turning the optical signal along with at least one fiber lead-on aligned to the TIR surface. The concepts disclosed provide the optical connector with a relatively small footprint that is advantageous for use with electronic devices having thin and compact profiles and the like.

Figure 1:
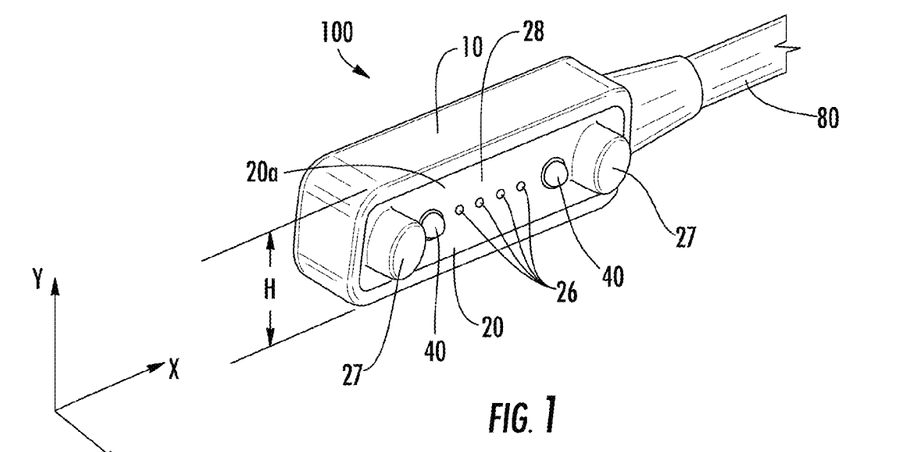
FIG. 1 is a perspective view of a cable assembly having an optical plug connector with an optical body according the concepts disclosed herein.
Figure 4:
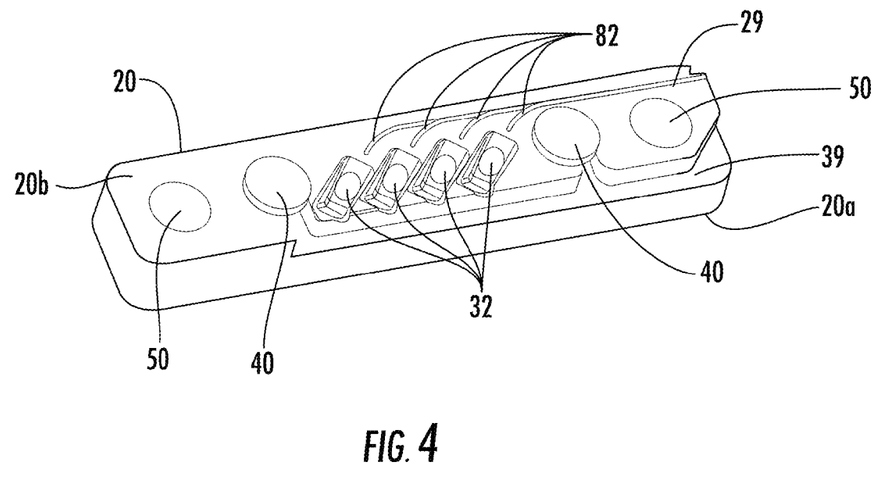
FIG. 4 is a perspective view of the rear side of the optical body of FIGS. 2 and 3 showing optical fibers routed to the optical channels of the optical body.
Figure 5:
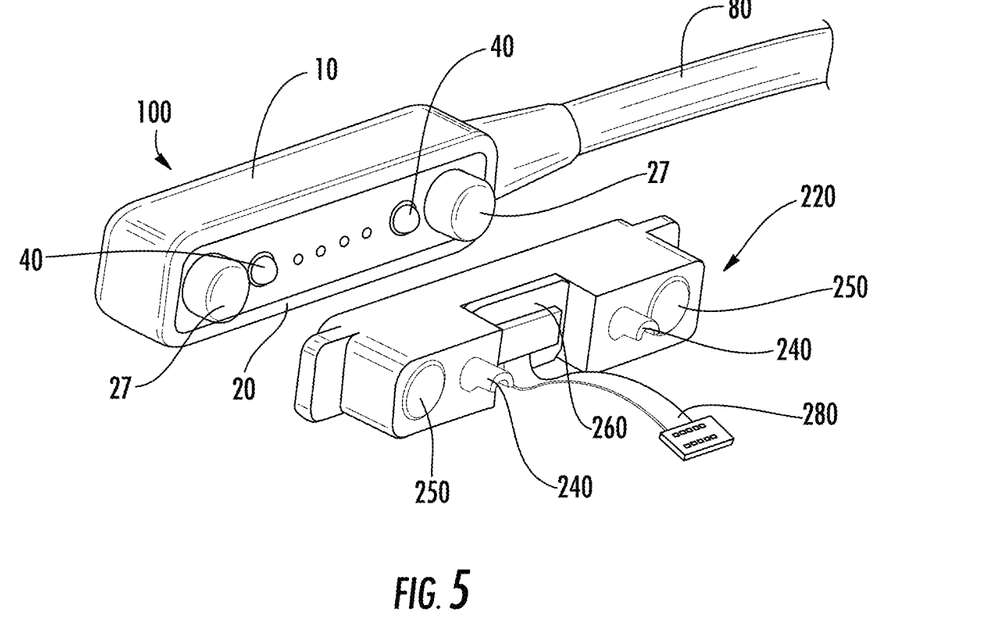
FIGS. 5 and 6 are perspective views showing the cable assembly of FIG. 1 along with a complimentary optical connector being aligned in preparation for mating.
Figure 6:
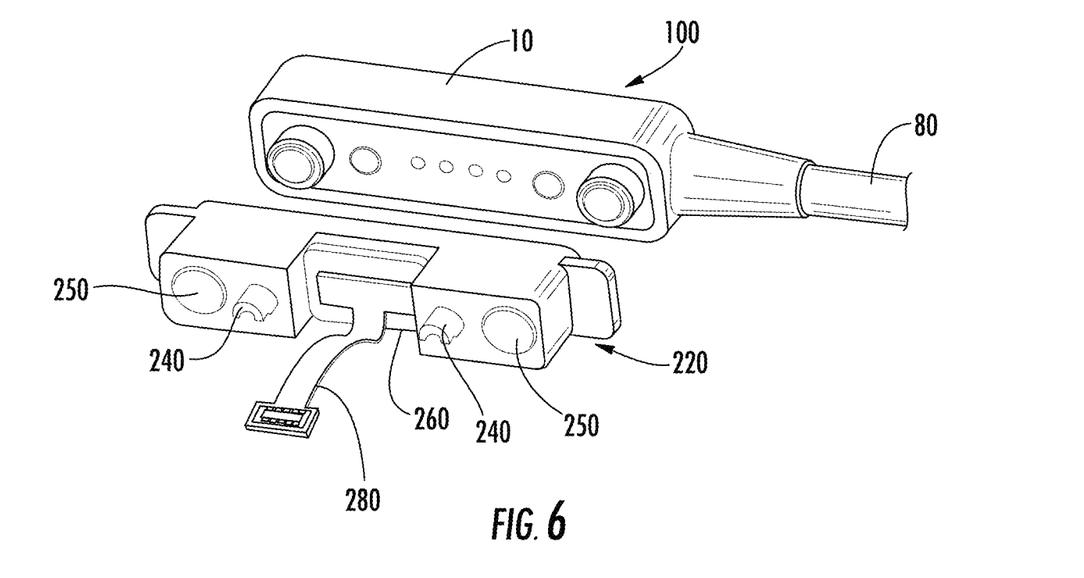
Figure 7:
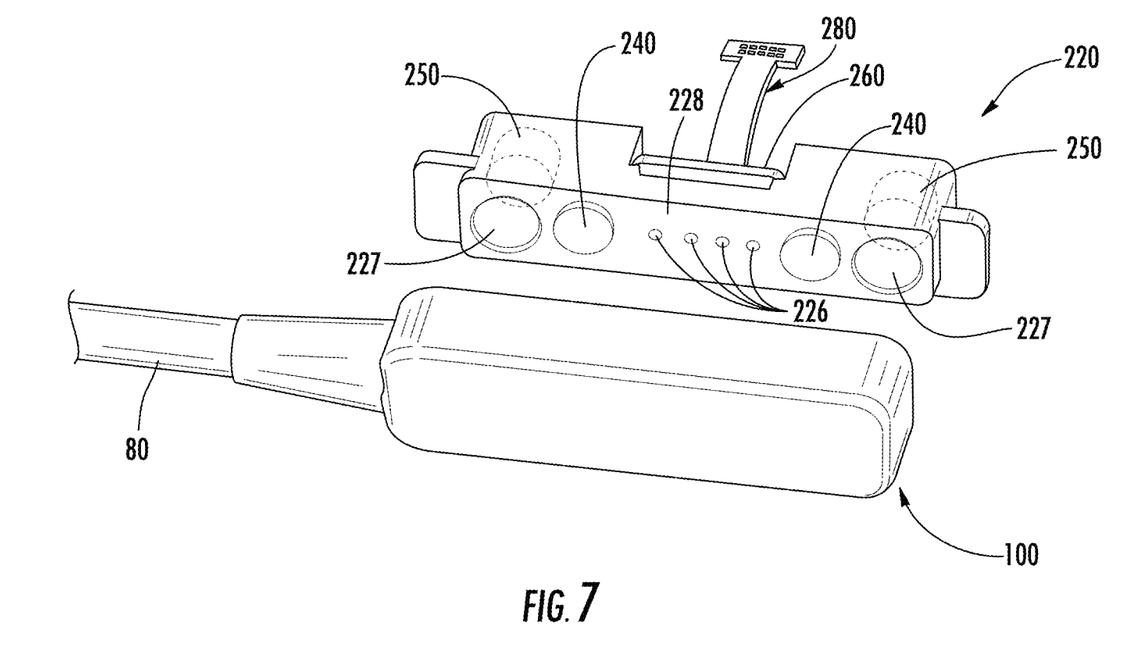
FIG. 7 is a perspective view of the cable assembly and complimentary optical connector of FIGS. 5 and 6 shown from the other side.

FIG. 1 is a perspective view of a cable assembly 100 having an optical connector 10 with an optical body 20 according the concepts disclosed herein. Cable assembly 100 includes an optical connector 10 attached to a cable 80 having at least one optical fiber 82 (FIG. 4). Optical connector 10 is configured as an optical plug connector, but the concepts disclosed may be used in other devices if desired. Optical connector 10 includes optical body 20 for making an optical connection with a complimentary optical connector such as depicted in FIGS. 5-7. Optical body 20 includes at least one optical channel 26 with an optical interface portion 28 at a first side 20a. The optical body 20 is formed from a suitable material for transmitting optical signals at the desired wavelength. As an example, the optical body 20 may be formed from LEXAN®. When assembled, the at least one optical fiber of the cable 80 is in optical communication with the optical body 20 of optical plug 10.

Optical body 20 may further include one or more alignment features 27 disposed on the first side 20a of the optical body 20. Alignment features 27 cooperate with complimentary features such as bores on the complimentary connector for suitable aligning the optical channels of the respective optical interface portions. In this embodiment, alignment features 27 are alignment pins; however, other suitable alignment features are possible for optical body 20 such as alignment bores or other structure. Optical connector 10 may solely provide an optical connection or may have a hybrid optical and electrical connection if desired. In this embodiment, optical connector 10 includes electrical contacts 40 that are disposed on opposite sides of the optical interface 28.

Figure 2:
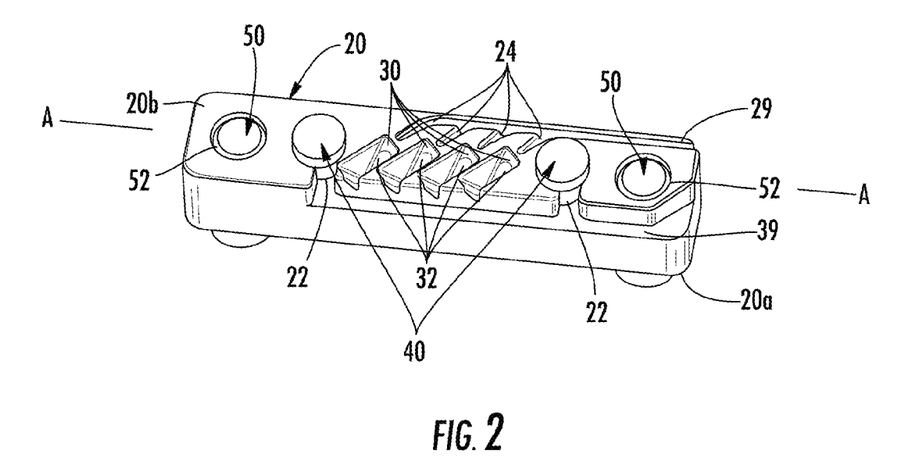
FIGS. 2 and 3 are perspective views showing a rear side of the optical body of the optical plug connector removed from the cable assembly of FIG. 1.
Figure 3:
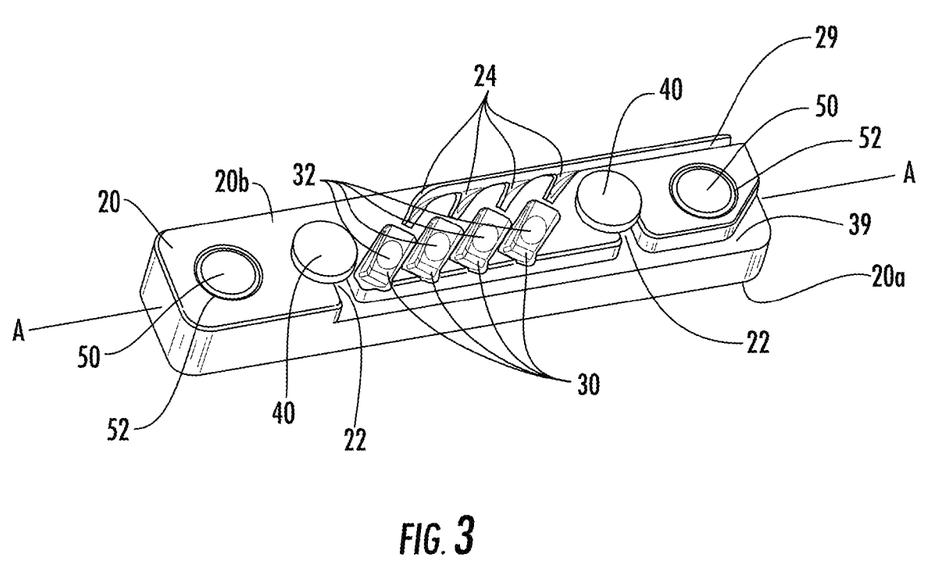

FIGS. 2 and 3 are perspective views showing a second side 20b of the optical body 20 of the optical connector 10 removed from the cable assembly 100. As depicted, the first side 20a is located on an opposite side from second side 20b. In this embodiment, optical body 20 has four optical channels 26 that terminate at the first side 20a for optical communication with a complimentary optical connection, but other variations of optical bodies may have any suitable number of optical channels. Each respective optical channel 26 includes a TIR surface 30 with a respective optional lens 32 for turning the optical signal at the second side 20b. TIR surface operates by using the different indexes of refraction between the material/air interface for turning the optical signal back into the optical body 20 and toward the optical interface 28. Using a TIR surface 30 allows for a relatively small footprint of optical connector 10 since it can turn the optical pathway. Moreover, the TIR surfaces 30 are located on angled surfaces disposed on second side 20b of optical body 20. By way of example and not limitation, the TIR surfaces 30 are disposed at one or more angles relative to a longitudinal axis A-A such as at about a 45 degree angle as discussed in more detail herein, but other angles are possible. This arrangement allows the optical connector 10 to advantageously have a relatively small footprint, especially in relatively small height for matching the small heights of thin devices such as tablets, smart phones and the like. By way of example, the optical connection 10 may have a height H of about 5 millimeters or less, but other dimensions are possible. The TIR surface 30 are also disposed at about a 45 degree angle with respect to the incoming optical fibers 82 that are routed in a runner 39 on the second side 20b. Lens 32 is used for focusing or collimating the respective optical signals and locating the lens at the TIR surface and also allows for a compact construction for the optical connector.

If optical body 20 may also optionally include one or more electrical contacts 40 if desired. As depicted, optical body 20 includes one or more bores 22 adjacent to the optical interface portion 28 for receiving one or more electrical contacts 40. The optical body 20 may include any suitable electrical contacts. In this embodiment, the optical connector 10 includes one or more pogo pin electrical contacts 40 in the one or more bores 22. In this arrangement, the electrical contacts 40 are inserted into the bores 22 from the second side 20b and a portion of the electrical contacts 40 extend beyond the first side 20a. Electrical contacts 40 may be secured to optical body 20 in any suitable manner such a friction fit, mechanical attachment or an adhesive. Additionally, optical body 20 has a runner 39 for routing electrical conductors (not shown) of cable 80 to the electrical contacts 40.

Optical body 20 may also optionally include one or more openings 52 at the second side 20b for receiving one or more magnetic materials 50. The one or more magnetic features are used for securing the optical connector 10 to the complimentary optical connector, but other variations using the concepts disclosed herein may use mechanical structures or other arrangements for securing the optical connector to the complimentary optical connector. If the magnetic materials 50 are used they may have any suitable location on the optical body 20. Further, the openings 52 may have any suitable location on the optical body 20. As used herein, "magnetic material" means a magnetic material or a ferrous material that is attracted to a magnet material. The magnetic material allows for quick and easy mating of the optical connection along with a robust and compact footprint for applications expecting a large number of mating/unmating cycles. By way of example, the optical body of the optical connector may include a first magnet and the complimentary optical connector may use a second magnet of opposite polarity for making an attachment between the respective optical connectors; alternatively, the first optical connector may use a first magnet and the second optical connector may use a ferrous material for making an attachment between the first and second optical connectors.

As depicted, optical body 20 has openings 52 disposed on opposite sides of the optical channels 26. In this arrangement, the one or more openings 52 are aligned with the one or more alignment features 27 on the first side 20a of the optical body 20. In this embodiment, the alignment features 27 are alignment pins as shown in FIG. 1. The openings 52 only extend partially into the alignment features 27 so the magnetic materials are not exposed, but rather covered by the alignment pins. Thus, the magnetic materials 50 are not visible at the first side 20a; however, other arrangements could have the magnetic materials visible at the first side 20a if desired. Thus, the alignment features 27 of this embodiment provide alignment and the magnetic materials 50 provide the retention to the complimentary optical connector.

FIG. 4 is a perspective view of the second side 20b of optical body 20 showing optical fibers 82 routed to the respective fiber lead-ins 24 so they are in optical communication with the respective optical channels 26 of the optical body 20. As depicted, the optical fibers 82 are routed within runner 39 for inhibiting undesired pinching or bending of the optical fibers 82.

FIGS. 5-7 are perspective views showing the cable assembly 100 being aligned with a complimentary optical body 220 that is a portion of a complimentary optical connector. When the optical plug connector 10 of cable assembly 100 is attached to the complimentary optical connector such as part of an electronic device an optical connection is enabled between optical body 20 of the optical connector 10 and the complimentary optical body 220 for optical communication across a mating interface.

Specifically, FIGS. 5 and 6 are perspective views showing the cable assembly 100 along with the optical body 220 of the complimentary optical connector being aligned in preparation for mating. FIG. 7 is a perspective view of the cable assembly 100 and complimentary optical connector of FIGS. 5 and 6 shown from the other side.

Optical body 220 has complimentary optical and electrical arrangement for cooperating with optical body 20 when mated. For instance, optical body 220 includes four optical channels 226 with an optical interface portion 228. Optical channels 226 have a suitable spacing and arrangement to align with optical channels 26 on optical interface portion 28 of optical body 20. Likewise, optical body 220 includes electrical contacts 240 configured as electrical pads that cooperate with the electrical contacts 40 of optical connection 10. Optical body 220 also includes alignment feature 227 disposed on opposite sides of the optical channels 226 with a similar space to alignment features 27 on optical body 20. In this embodiment, alignment features 227 are arranged as bores having a suitable size and shape for properly aligning the optical channels of optical bodies 220,20. Further, the rear portion of the alignment features 227 each have a suitable magnetic material 250 for cooperating with the magnetic materials of optical connection 10.

As described herein, the optical signals received by the complimentary optical connector may be converted into electrical signals and vice versa for transmitting signals to and from a complimentary electronic device that is optically connected to cable assembly 100. In order to transmit/receive optical signals, the optical body 220 may have an optical channel that directs the optical signals to the desired location using an in-line optical channel for directing the optical signal(s) to one or more active components on a circuit board. Alternatively, the optical channel may include a total internal reflection (TIR) surface on the optical body for turning the optical signal(s) of the respective optical channels for directing the optical signal(s) to one or more active components on a circuit board, but other arrangements are possible. Further, optical body 220 may include one or more lenses as desired. If used, the one or more lenses of the optical body 220 are used for collimating or focusing the optical signal. By way of further explanation and not limitation, the transmission optical channel of the optical body 220 of an electronic device is optically coupled to a laser such as a vertical-cavity surface-emitting laser (VCSEL) or laser diode of the electronic device, which is in further optical communication with an optical fiber 82 of cable assembly 100 that is in optical communication with optical body 20, and from the optical fiber 82 to the optical body 20 of cable assembly 100 to a receive optical channel of the optical body 220 that is optically coupled to an active element such as a photodiode or the like. The active components (not visible) may be disposed on a circuit board 260.

In this embodiment, circuit board 260 is attached to a rear side of optical body 220 at a suitable distance with an in-line arrangement behind the optical channels 226. The active components are suitable aligned with the optical channels 226 for proper optical communication. As shown, circuit board 260 has an electrical tether 280 attached thereto for transferring electrical signals to another location such as another circuit board.

Figure 8:
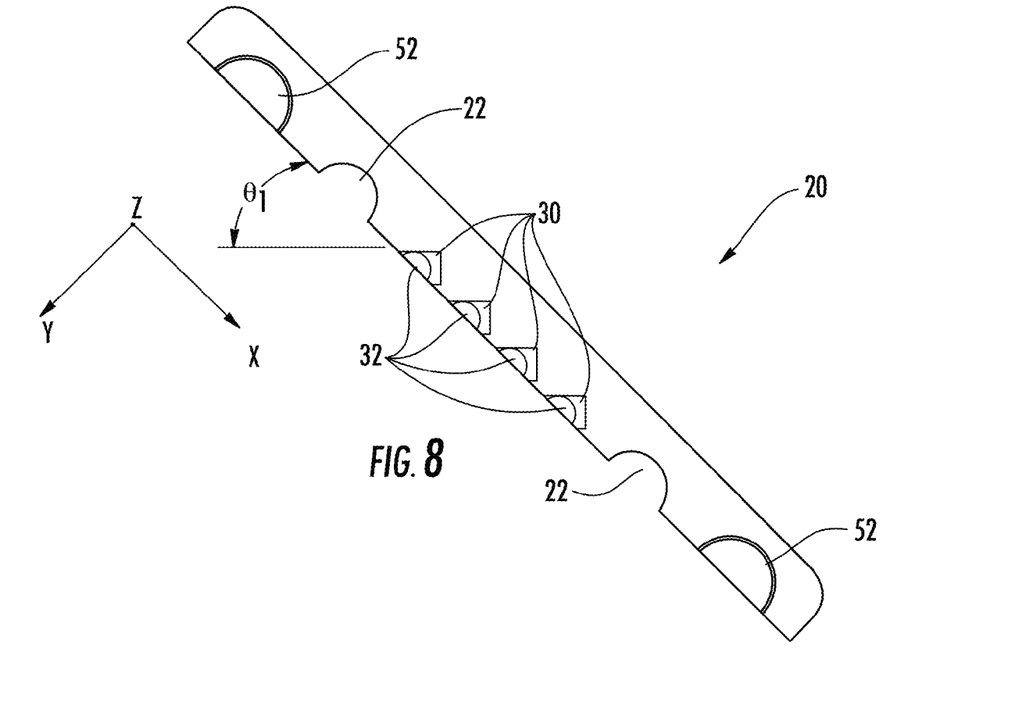
FIGS. 8 and 9 are sectional views showing the optical body of the optical plug connector FIG. 1 showing the orientation of the TIR surface relative to a longitudinal axis A-A defined between a first alignment feature and a second alignment feature of the optical body.
Figure 9:
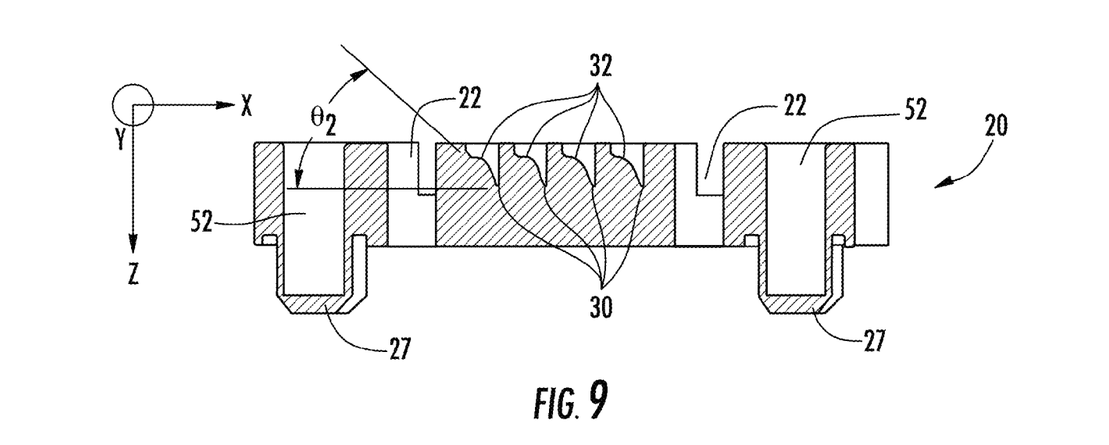
Figure 10:
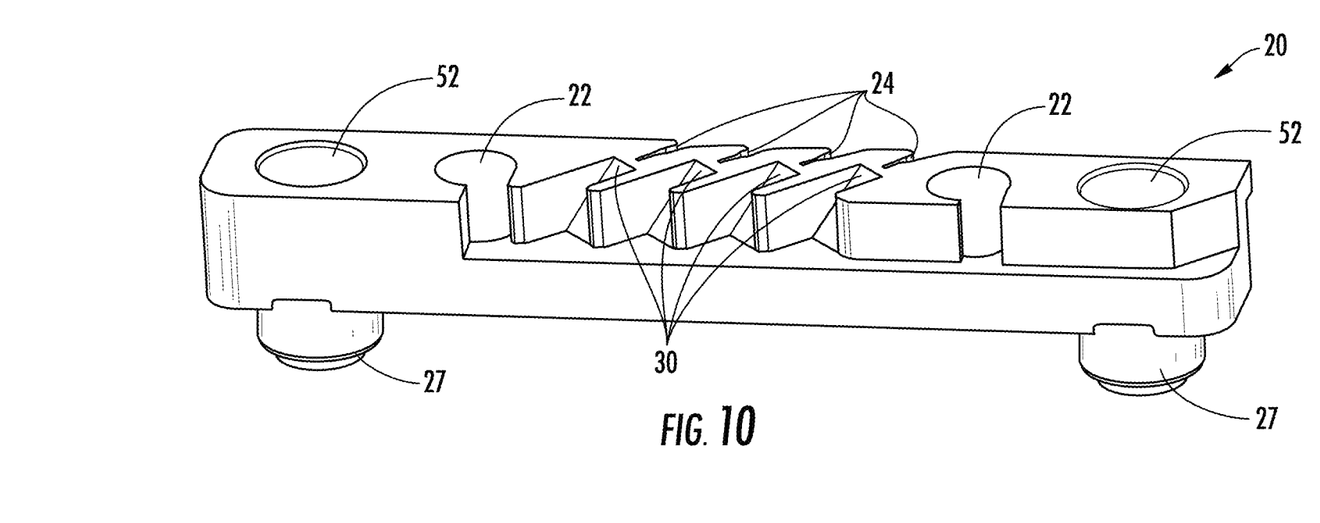
FIG. 10 is perspective view showing a rear side of the optical body of FIGS. 2-4 with all of the components removed.

FIGS. 8-10 depict other views of optical body 20 showing further details. FIGS. 8 and 9 are sectional views of optical body 20 showing an orientation of the TIR surfaces 30 with respect to a longitudinal axis A-A defined between the center of the first alignment feature 27 and the center of the second alignment feature 27. Specifically, the TIR surface 30 may be angled in a first direction by a first non-zero angle $\theta_1$ relative to a longitudinal axis A-A defined between the first alignment feature and the second alignment feature of optical body 20. The angle in the first direction is measured relative to a first plane (e.g., the X-Z plane) and allows a compact form-factor for the optical body 20. By way of example, angle $\theta_1$ is a non-zero angle (e.g., relative to the X-Z plane) that arranges the TIR surfaces 30 at an angle relative to the longitudinal axis A-A. Arranging the TIR surfaces 30 at a first angle $\theta_1$ allows for a smaller footprint of the optical body 20 in a Y-direction since the TIR surfaces 30 are not aligned in the Y-direction and can take less space in the Y-direction. By way of example, angle $\theta_1$ is forty-five degrees, but other suitable angles are possible according to the concepts disclosed. Further, angling the TIR surfaces in the first direction allows for a smooth optical fiber lead-in transition to the optical body 20.

Likewise, the TIR surfaces 30 may also be angled in a second direction by a second non-zero angle $\theta_2$ relative to a longitudinal axis A-A defined between the first alignment feature 27 and the second alignment feature 27 of optical body 20. Second plane is generally perpendicular to the first plane.

The angle of the second direction is measured relative to a first plane (e.g., the X-Y plane) and also allows a compact form-factor for the optical body 20. By way of example, second angle $\theta_2$ is a non-zero angle (e.g., relative to the X-Y plane) that arranges the TIR surfaces 30 at an angle relative to the longitudinal axis A-A. Arranging the TIR surfaces 30 at second angle $\theta_2$ allows for a smaller footprint of the optical body 20 in an X-direction since the TIR surfaces 30 may take up less space in X-direction. Since the TIR surfaces are tilted with respect to the X-direction they take less space in the X-direction. By way of example, angle $\theta_2$ is forty-five degrees, but other suitable angles are possible according to the concepts disclosed.

Figure 11:
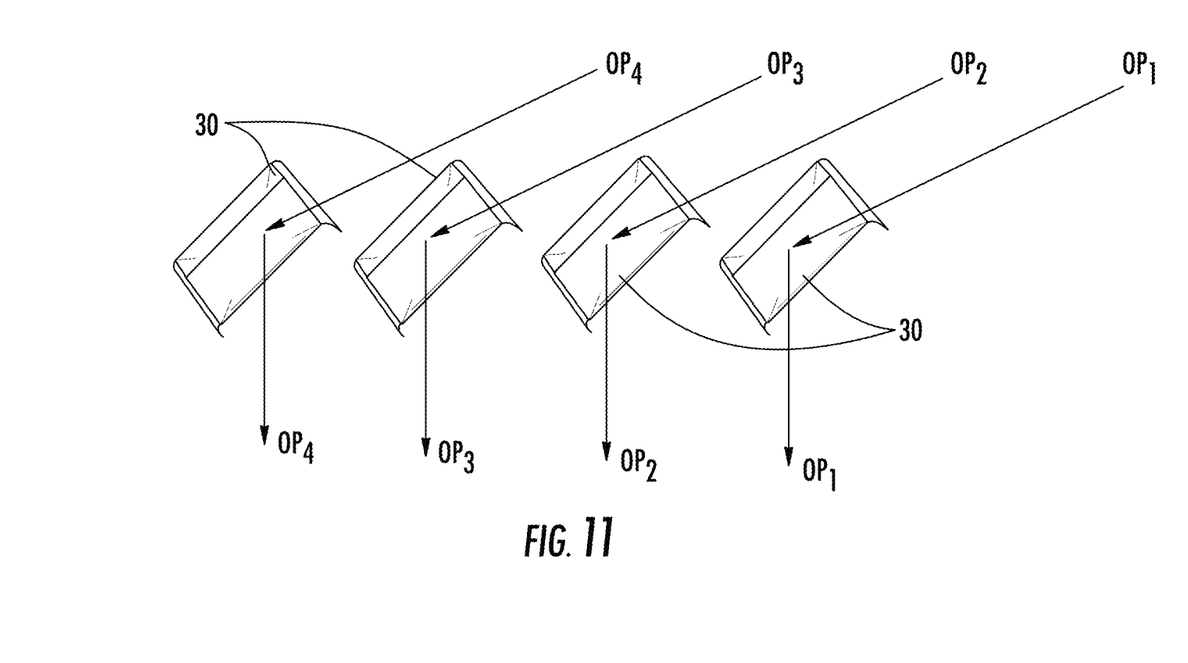
FIG. 11 schematically depicts optical pathways for the individual optical channels of the optical body.

FIG. 11 schematically depicts optical pathways $OP_1$-$OP_4$ for the individual optical channels of optical body 20. As depicted, each optical channel of optical body has a discrete TIR surface 30, thereby allowing a smaller footprint for the optical body 20 compared with an optical body having a common TIR surface for all of the optical channels. Other embodiments according to the concepts can have optical bodies with multiple TIR surfaces, but with more than one optical channel per TIR surface; however, this may result is larger footprints for the optical body.

The disclosure is also directed to method for making an optical connector. One explanatory method of making an optical connector includes the steps of providing an optical body having at least one optical channel with an optical interface portion at a first side, the at least one optical channel having a TIR surface with a lens at a second side for turning the optical signal, and at least one fiber lead-in aligned to the TIR surface, and attaching at least one optical fiber to the at least one fiber lead-in. The method may also optionally include the step of attaching one or more magnetic materials to one or more openings at the second side of the optical body, where the one or more openings are aligned with one or more alignment features on the first side of the optical body. Additionally, the method may also optionally further include the step of attaching one or more electrical contacts to the optical body.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical connector, comprising:
   an optical body comprising at least one optical channel with an optical interface portion at a first side, the at least one optical channel having a total internal reflection (TIR) surface with a lens at a second side, and at least one fiber lead-in aligned at a first end to the TIR surface at the second side; wherein:
   the TIR surface is angled in a first direction from a longitudinal axis defined between a first alignment feature and a second alignment feature that are disposed on the first side of the optical body;
   the TIR surface is angled in a second direction from the longitudinal axis; and
   the second side of the optical body is co-aligned with the longitudinal axis.

2. The optical connector of claim 1, the optical body defining a plurality of optical channels where each optical channel includes a discrete TIR surface for that optical channel.

3. The optical connector of claim 1, further including one or more bores adjacent to the optical interface portion for receiving one or more electrical contacts.

4. The optical connector of claim 3, further including one or more pogo pin electrical contacts in the one or more bores.

5. The optical connector of claim 1, further including one or more alignment features on the first side of the optical body.

6. The optical connector of claim 5, wherein the one or more alignment features are alignment pins.

7. The optical connector of claim 1, the optical body further including one or more openings at the second side for receiving one or more magnetic materials.

8. The optical connector of claim 1, further including one or more openings at the second side for receiving one or more magnetic materials and the one or more openings being aligned with one or more alignment features on the first side of the optical body.

9. The optical connector of claim 8, wherein the one or more alignment features are alignment pins.

10. The optical connector of claim 1, wherein the first side is located on an opposite side from the second side.

11. An optical connector, comprising:
    an optical body comprising at least one optical channel with an optical interface portion at a first side, the at least one optical channel having a total internal reflection (TIR) surface with a lens at a second side, and at least one fiber lead-in aligned at a first end to the TIR surface at the second side, and including one or more openings at the second side for receiving one or more magnetic materials and the one or more openings being aligned with one or more alignment features on the first side of the optical body, wherein:
    the TIR surface is angled in a first direction from a longitudinal axis defined between a first alignment feature and a second alignment feature that are disposed on the first side of the optical body;
    the TIR surface is angled in a second direction from the longitudinal axis; and
    the second side of the optical body is co-aligned with the longitudinal axis.

12. The optical connector of claim 11, the optical body defining a plurality of optical channels where each optical channel includes a discrete TIR surface for that optical channel.

13. The optical connector of claim 11, further including one or more bores adjacent to the optical interface portion for receiving one or more electrical contacts.

14. The optical connector of claim 13, further including one or more pogo pin electrical contacts in the one or more bores.

15. The optical connector of claim 11, wherein the one or more alignment features are alignment pins.

16. The optical connector of claim 11, wherein the first side is located on an opposite side from the second side.

17. A method for making an optical connector, comprising:
providing an optical body comprising a plurality of optical channels with an optical interface portion at a first side, the plurality of optical channels each having a respective total internal reflection (TIR) surface with a lens, and at least one fiber lead-in aligned at a first end to the TIR surface at the second side; and
attaching at least one optical fiber to the at least one fiber lead-in, wherein:
the TIR surfaces are angled in a first direction from a longitudinal axis defined between a first alignment feature and a second alignment feature that are disposed on the first side of the optical body;
the TIR surfaces are angled in a second direction from the longitudinal axis; and
the second side of the optical body is co-aligned with the longitudinal axis.

18. The method of claim 17, further including attaching one or more magnetic materials to one or more openings at the second side of the optical body, wherein the one or more openings are aligned with one or more alignment features on the first side of the optical body.

19. The method of claim 17, further including the step of attaching one or more electrical contacts to the optical body.

20. The optical connector of claim 1, wherein:
the first end of the at least one fiber lead-in is angled with respect to a longitudinal axis defined between a first alignment feature and a second alignment feature that are disposed on the first side of the optical body, and
a second end of the at least one fiber lead-in is co-aligned with the longitudinal axis.

21. The optical connector of claim 11, wherein:
the first end of the at least one fiber lead-in is angled with respect to a longitudinal axis defined between a first alignment feature and a second alignment feature that are disposed on the first side of the optical body, and
a second end of the at least one fiber lead-in is co-aligned with the longitudinal axis.

22. The method of claim 17, wherein:
the first end of the at least one fiber lead-in is angled with respect to a longitudinal axis defined between a first alignment feature and a second alignment feature that are disposed on the first side of the optical body, and
a second end of the at least one fiber lead-in is co-aligned with the longitudinal axis.

\* \* \* \* \*